(12) United States Patent
Topliss et al.

(10) Patent No.: US 8,073,320 B2
(45) Date of Patent: Dec. 6, 2011

(54) SHAPE MEMORY ALLOY ACTUATION APPARATUS

(75) Inventors: Richard Topliss, Cambridge (GB); Shinichi Makino, Kanagawa (JP); Anthony Hooley, Cambridge (GB); Dominic George Webber, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 0 days.

(21) Appl. No.: 12/525,909

(22) PCT Filed: Feb. 11, 2008

(86) PCT No.: PCT/GB2008/000477
§ 371 (c)(1),
(2), (4) Date: Dec. 4, 2009

(87) PCT Pub. No.: WO2008/099155
PCT Pub. Date: Aug. 21, 2008

(65) Prior Publication Data
US 2010/0074607 A1    Mar. 25, 2010

(30) Foreign Application Priority Data

Feb. 12, 2007 (GB) .................................. 0702677.6
May 14, 2007 (GB) .................................. 0709229.9
Jul. 19, 2007 (GB) .................................. 0714128.6

(51) Int. Cl.
*G03B 3/10* (2006.01)

(52) U.S. Cl. ..................................................... 396/133

(58) Field of Classification Search ............... 396/89, 396/133, 529, 541; 348/373–376; 310/307; 318/117; 60/528; 148/402, 563
See application file for complete search history.

(56) References Cited

U.S. PATENT DOCUMENTS

| | | | |
|---|---|---|---|
| 4,977,886 A | 12/1990 | Takehana et al. | |
| 5,459,544 A | 10/1995 | Emura | |
| 6,434,333 B2 | 8/2002 | Tanaka et al. | |
| 6,449,434 B1 | 9/2002 | Fuss | |
| 2004/0263299 A1 | 12/2004 | Noji | |
| 2006/0109570 A1 | 5/2006 | Ohtsuka et al. | |

(Continued)

FOREIGN PATENT DOCUMENTS

EP             1 640 757           3/2006

(Continued)

OTHER PUBLICATIONS

International Search Report for PCT/GB2008/000477, mailed Jun. 6, 2008.

(Continued)

*Primary Examiner* — W.B. Perkey
*Assistant Examiner* — Minh Phan
(74) *Attorney, Agent, or Firm* — Nixon & Vanderhye P.C.

(57) ABSTRACT

A miniature camera lens actuation apparatus provides an auto-macro function in which a camera lens element has two focus positions. In one type of apparatus, a shape memory alloy actuator arranged to drive movement of the camera lens element relative to a support structure against an end-stop arranged to limit the movement. The shape memory alloy actuator is connected to one of the movable element and the support structure by a compliant connector. This limits the stresses on the shape memory alloy actuator and therefore increases its lifetime. In another type of apparatus, the suspension system supporting the movable element on the support structure provides the movable element with two stable positions along the movement direction.

18 Claims, 7 Drawing Sheets

U.S. PATENT DOCUMENTS

2007/0047938 A1* 3/2007 Suzuki et al. .................. 396/89
2009/0295986 A1* 12/2009 Topliss et al. ................ 348/374

FOREIGN PATENT DOCUMENTS

| | | |
|---|---|---|
| JP | 61-229977 | 10/1986 |
| JP | 2002-130114 | 5/2002 |
| JP | 2004-333995 | 11/2004 |
| JP | 2006-330542 | 12/2006 |
| JP | 2007-78954 | 3/2007 |
| WO | WO 01/47041 | 6/2001 |
| WO | 02/103451 | 12/2002 |
| WO | WO 03/048831 | 6/2003 |
| WO | WO 03/095798 | 11/2003 |
| WO | WO 2006/059098 | 6/2006 |
| WO | WO 2007/113478 | 10/2007 |

OTHER PUBLICATIONS

Written Opinion of the International Searching Authority for PCT/GB2008/000477, mailed Jun. 6, 2008.

* cited by examiner

SHAPE MEMORY ALLOY ACTUATION APPARATUS

This application is the U.S. national phase of International Application No. PCT/GB2008/000477, filed 11 Feb. 2008, which designated the U.S. and claims priority to GB Application No. 0702677.6 filed 12 Feb. 2007; GB Application No. 0709229.9 filed 14 May 2007; and GB Application No. 0714128.6 filed 19 Jul. 2007, the entire contents of each of which are hereby incorporated by reference.

The present invention relates to a shape memory alloy (SMA) actuation apparatus using SMA material as an actuator to drive movement of a movable element.

The present invention has particular application to actuation of a camera lens element, for example of the type used in a miniature camera which may be employed in a portable electronic device such as a mobile telephone or a mobile digital data processing and/or transmitting device.

In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied.

One desirable function for such miniature cameras is auto-focus, where the camera is able to automatically focus on objects over a range of different distances from the camera on command by the user. This function has an associated value, but it is currently a challenge to meet requirements for camera size and cost. An alternative function which is simpler and therefore potentially lower cost is auto-macro in which the camera is focused to either one of two specific positions termed (i) far-focus and (ii) macro (near-focus). Typically, focussing functions are achieved by mechanically moving the lens relative to the image sensor onto which the image is to be focussed. In contrast to auto-focus for which the movement needs to be controlled with high precision to accurately seek and maintain many intermediate positions between far-focus and macro, for auto-macro it is only necessary to move between two, fixed positions. Therefore, the electronics and control algorithm for auto-macro can potentially be greatly simplified.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electroactive devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element.

The use of SMA material as an actuator for a small object such as the camera lens element of a miniature camera provides the advantages of being intrinsically linear, providing a high power per unit mass, being a low cost commodity item and being a relatively small component.

The present invention is concerned with arrangements applicable to provide an auto-macro function in a camera. However, similar considerations apply to actuation arrangements for a wide range of other small movable element and so the present invention is equally applicable to other applications where an actuation apparatus is desired for moving a movable element between two positions.

The first aspect of the present invention is concerned with increasing the lifetime of the SMA actuator.

According to a first aspect of the present invention, there is provided a shape memory alloy actuation apparatus comprising:

a support structure;

a movable element supported on the support structure by a suspension system which guides movement of the movable element;

an end-stop arranged to limit one end of the range of movement of the movable element;

a shape memory alloy actuator arranged to drive movement of the movable element relative to the support structure towards the end-stop on contraction of the shape memory alloy material, wherein the shape memory alloy actuator is connected to one of the movable element and the support structure by a compliant connector.

The present invention involves a shape memory alloy actuation apparatus having an end-stop arranged to limit one end of the range of movement of the movable element. The end-stop sets the position of the movable element at the end of the range of movement, and ensures the position is repeatable and does not vary over repeated movement cycles, being largely independent of the detailed motion and force output of the actuator. In general, the amount of electrical heating power needed to cause a shape memory alloy actuator to contract a specific amount will vary between different apparatuses due to manufacturing tolerances, and also vary due to ambient temperature (the higher the temperature the less heating power needed). If the shape memory alloy actuator is driven with a simple fixed constant current, these factors cause the final lens position to be highly variable, but the use of an end-stop can remove this variance by designing the apparatus so that the movable element is always driven against the end-stop. In that case, the only tolerance is in the positioning of the end-stop.

Also, pushing the movable element against the end-stop means that the end-stop can be used to set the tilt of the movable element relative to the image sensor. This significantly reduces the constraints on the suspension system which guides movement of the movable element to control tilt. This is a particular issue in the case of a moveable element which is a camera lens element, in which case tilt can degrade the optical performance.

Such an end-stop has particular application in the case of a movable element which is moved between two positions, as for example in the case of a camera provided with an auto-macro function. In this case the use of the end-stop also allows the drive circuit for the shape memory alloy actuator to be simplified compared to that for an auto-focus function, as the requirements for controlling power are reduced. For example, the drive signal may be controlled by a simple switch. On the other hand, such an end-stop may equally be applied to a shape memory alloy actuation apparatus which drives movement over a range of positions.

However, it has been appreciated that the use of the end-stop poses a problem of potentially reducing the lifetime of the shape memory alloy actuator. When the movable element is driven against the end-stop, the stress in the shape memory alloy actuator is high and the shape memory alloy actuator is in the Austenite phase in which the actuator is stiff and unable to accommodate large stresses without fatigue issues.

However, this problem is reduced by the shape memory alloy actuator being connected to one of the movable element and the support structure by a compliant connector. In this case, the compliant connector takes up some of the stress when the movable element is driven against the end-stop. This reduces the stress on the shape memory alloy actuator and therefore increases its lifetime.

According to a second aspect of the present invention, there is provided a shape memory alloy actuation apparatus comprising:

a support structure;
a movable element;
a suspension system supporting the movable element on the support structure and guiding movement of the movable element relative to the support structure in a movement direction, the suspension system being capable of supporting the movable element in two stable positions along the movement direction; and
two shape memory alloy actuators each arranged on contraction thereof to drive movement of the movable element in respective, opposite directions between the two stable positions.

Typically in a shape memory alloy actuation apparatus, a shape memory alloy actuator on contraction thereof drives movement of a movable element against a biasing arrangement arranged to provide biasing of the movable element in an opposite direction. In the case of a movable element which is moved between two positions, as for example in the case of a camera provided with an auto-macro function, there can be no (or low) power consumption at one of the two positions when the shape memory alloy is not heated sufficiently to contract, but there is continuous power consumption at the other of the two positions when the shape memory alloy is heated to contract. However, the second aspect of the present invention provides an apparatus in which the overall power consumption is reduced, as follows.

In accordance with the second aspect of the present invention the suspension system by which the movable element is supported and guided is capable of supporting the movable element in two stable positions along the movement direction. Thus the movable element is capable of being held, or mechanically latched, in either of the stable positions without the application of power to any shape memory alloy actuator. Two shape memory alloy actuators are provided to move the movable element between the two stable positions, but after the movement power may be removed from the actuators. Thus power is only consumed during the movement. This reduces the power consumption as compared to the case that the shape memory alloy actuator drives movement against a biassing arrangement.

All the aspects of the invention have particular application to a miniature camera lens element which includes one or more lenses having a diameter of at most 10 mm.

The two aspects of the present invention may be applied together to particular advantage.

To allow better understanding, an embodiment of the present invention will now be described by way of non-limitative example with reference to the accompanying drawings, in which.

There will first be described the structure of a camera 1 incorporating a shape memory alloy (SMA) actuation apparatus.

Figure 1:
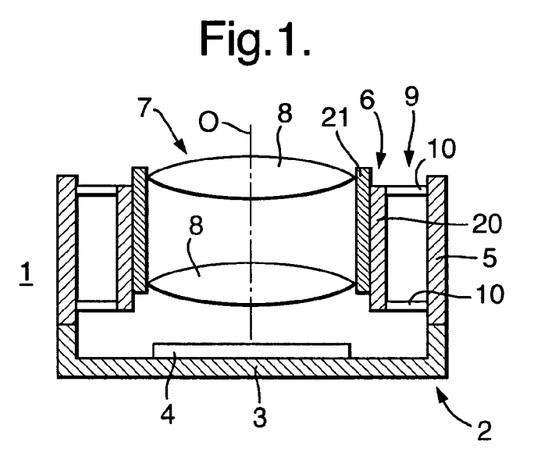
FIG. 1 is a schematic cross-sectional view of a camera incorporating an SMA actuation arrangement.

The camera 1 is shown schematically in FIG. 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4.

The lens element 6 is suspended on the support structure 2 by a suspension system 9 consisting of two suspension elements 10 connected between the annular wall 5 of the support structure 2 and the lens element 6. The suspension system 9 guides movement of the lens element 6 along the optical axis O. Such movement of the lens element 6 changes the focus of the image formed on the image sensor 4.

Figure 2:
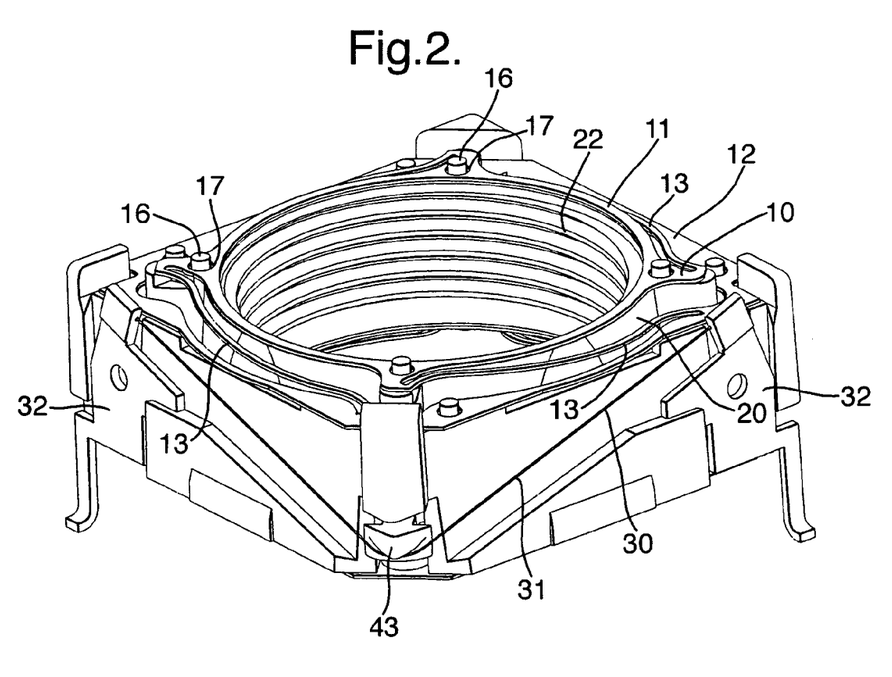
FIG. 2 is a detailed perspective view of the camera.
Figure 3:
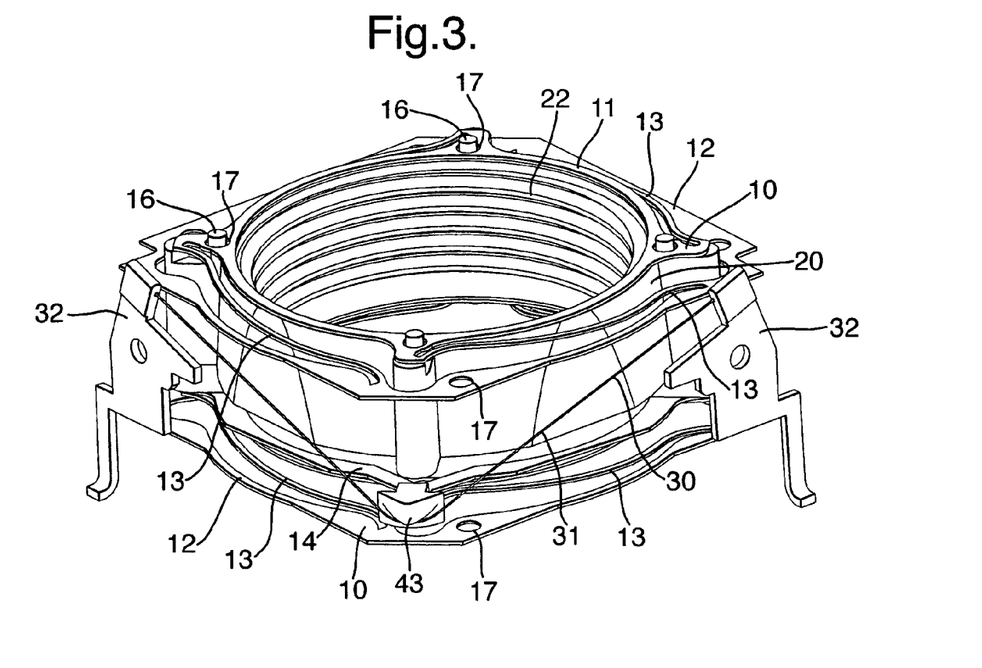
FIG. 3 is a detailed perspective view of the camera with the support structure omitted.

The detailed construction of the camera 1 is shown in FIGS. 2 and 3 which are both detailed perspective views, but in FIG. 3 the support structure 2 is omitted for clarity.

The lens element 6 has a two-part construction comprising a lens carrier 20 and a lens holder 21 mounted inside the lens carrier 20 on an internal screw thread 22 formed inside the lens carrier 20. The lens carrier 20 is shown in isolation in FIG. 3. Typically the lens holder 21 has a diameter of 6.5 mm. Connected to the lower rim of the lens carrier 20 is a metal support 14 described further below. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The suspension system 9 for the lens element 6 will now be described in detail. The suspension system 9 comprises two suspension elements 10 each formed from a respective single sheet of material such as steel or beryllium copper cut into shape. One possibility is hard rolled grade 302 austenitic steel which has the advantage of providing a high yield stress. The suspension elements 10 are mounted at opposite ends of the carrier 20. Both suspension elements 10 have an identical construction, as follows.

Each suspension element 10 comprises an inner ring 11 connected to the lens carrier 20. In particular, the inner ring 11 is connected to a respective end surface of the lens carrier 20 so that it extends around the outer circumference of the lens holder 21.

Each suspension element 10 further comprises an outer ring 12 connected to the support structure 2. In particular, the outer ring 12 extends around and is connected to the end surface of the annular wall 5 of the support structure 2.

The inner ring 11 and outer ring 12 are located on the lens carrier 20 and annular wall 5 by location posts 16 which extend through apertures 17 in the inner ring 11 and outer ring 12, and are fixed by adhesive, such as a cyanoacrylate that is also LTV curable, dispensed onto the ends of the location pins 16. As an alternative to adhesive, it is possible to form the joints be heat staking the location pins 16 to form a plastic head that retains the parts mechanically.

Lastly, each suspension element 10 comprises four flexures 13 which each extend between the inner ring 11 and the outer ring 12. Thus the flexures 13 are coupled at opposite ends to the lens element 6 and the support structure 2. As viewed along the optical axis O, the flexures 13 are inclined relative to the direction radial of the optical axis O. Thus the flexures 13 extend around the optical axis O. The flexures 13 are disposed around the lens carrier 20 at different radial positions with rotational symmetry around the optical axis O. Furthermore, the flexures 13 have a thickness along the optical axis O (that is the thickness of the sheet of material from which the suspension element 10 is made) which is smaller than their width in a direction perpendicular to the optical axis O. The suspension system 9 is designed with an appropriate number of flexures 13 of appropriate width, thickness and length to provide the desired degree of stiffness along the optical axis O and perpendicular thereto. The flexures 13 typically have a thickness in the range from 25 μm to 100 μm. The number of flexures 13 may be changed by varying the number of flexures 13 within a suspension element 10 and/or by providing additional suspension elements 10.

The flexures 13 are also curved along their length as viewed along the optical axis O with three regions of alternating curvature. By introducing such curvature to the flexures 13, a degree of strain relief is added to the structure. The tendency of the flexures 13 to plastically deform is reduced and instead the flexures 13 have a tendency to bend elastically. By introducing the outer regions having opposite curvature to the central region, the force imbalance is reduced and the stress developed at the joints with the inner ring 11 and outer ring 12 are reduced. Thus the flexures 13 become more compliant in the planar direction without experiencing material failure. This is achieved without an unacceptable compromise to the radial and axial stiffnesses. This allows the suspension system 9 to accommodate the displacement of the lens element 6 radially of the optical axis O caused by mechanical impacts without causing permanent damage to the flexures 13. To limit the displacement in this direction, the camera 1 is provided with a small clearance, for example of the order of 50 μm or less, between the lens element 6 and the wall 5 of the support structure 2 so that the wall 5 of the support structure 2 acts as a stop to limit the maximum displacement.

To maximize this effect the three regions of the flexures 13 preferably have unequal lengths and curvature, in particular with the central region having a greater length and a lesser curvature than the outer regions. Advantageously, the central region has a length which is at least twice the length of the outer regions, for example with the ratio of the lengths of the three regions 1:2.5:1. Advantageously, the central region has a curvature which is at most half the curvature of the outer regions, for example with the ratio of length to curvature of each region being substantially the same so that the angles subtended by each region are substantially the same.

Optionally each flexure 13 could be modified to consist of a group of parallel flexures to allow the suspension system 9 to be made more compliant radially of the optical axis by reducing the width of each parallel flexure. The practical limitation to this technique is the minimum width to which the parallel flexures may be manufactured.

The two suspension elements 10 suspend the lens element 6 on the support structure 2 by means of the flexures 13 being coupled between the lens element 6 and the support structure 2. Due to their configuration, the flexures 13 accommodate movement of the lens element 6 along the optical axis O by flexing or bending. When the lens element 6 moves along the optical axis O, the inner rings 11 move along the optical axis O relative to the outer rings 12 with consequent bending of the flexures 13.

As the flexures 13 have a thickness parallel to the optical axis O which is smaller than their width, the flexures 13 are more compliant to bending in their thickness direction than to bending in their width direction. Accordingly, the flexures 13 provide the suspension system 9 with a lower degree of stiffness against movement of the lens element 6 relative to the support structure 2 along the optical axis O, than against movement of the lens element 6 relative to the support structure 2 perpendicular to the optical axis O.

Furthermore, the two suspension elements 10 are spaced apart along the optical axis O and thus the resistance to movement of the lens element 6 perpendicular to the optical axis O also provides resistance to tilting of the lens element 6.

Such resistance to off-axis movement and tilting of the lens element 6 is desirable because such off-axis movement and tilting can degrade the optical performance of the lens system 7 in focussing an image on the image sensor 4.

In addition, the camera 1 comprises an SMA actuator 30 comprising a piece of SMA wire 31 connected between the support structure 2 and the lens element 6. The SMA wire is connected at each end to a respective mounting member 32, each formed as an elongate piece of metal for example brass. The mounting members 32 are each crimped over the SMA wire 31.

During manufacture, the SMA actuator 30 (comprising the SMA wire 31 and mounting members 32) is made separately from the remainder of the camera 1. In particular, the SMA actuator 30 is manufactured by holding the mounting members 32 in place, applying the SMA wire 31 taut over the mounting members 32 and then crimping the mounting members 32 over the SMA wire 31. The SMA actuator 30 is then assembled into the camera 1.

The SMA actuator 30 is connected to the support structure 2 by the two mounting members 32 each being mounted onto the outside of the annular wall 5, for example by adhesive, swaging of the wall 5 or some other means.

Figure 4:
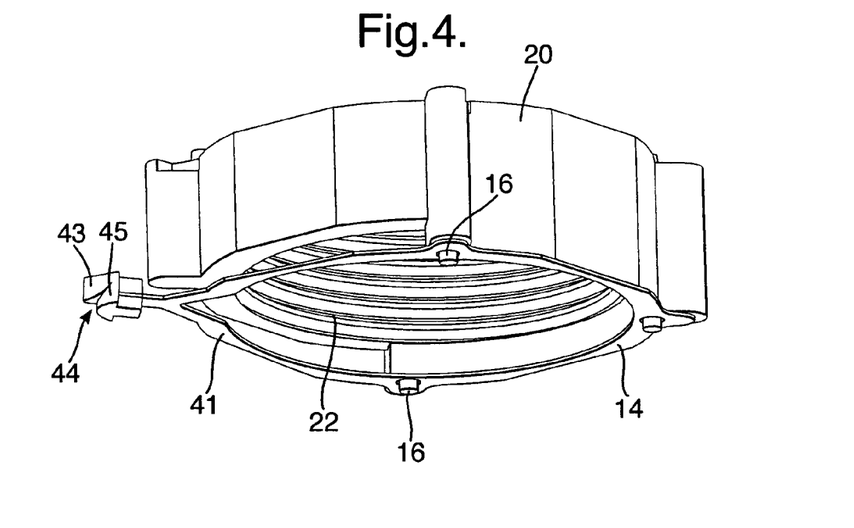
FIG. 4 is a perspective view of the lens element of the camera.

The SMA actuator 30 is connected to the lens element 6 by the piece of SMA wire 31 being hooked over a resilient flexure element 41 which is an integral part of the metal support 14 movable element connected to the lens carrier 20 of the lens element 6. As shown in FIG. 4, the metal support 14 is annular and is connected to the lens carrier 20 at two diametrically opposed locations over two of the location posts 16 underneath the inner ring 11. The resilient flexure element 41 is a part of the metal support 14 which protrudes outwardly of the lens element 6 from the location posts 16. A hook member 43 formed from moulded plastic is fixed to the outermost portion of the resilient flexure element 41. The hook member 43 has a notch 44 of which the inner surface 45 is curved. As shown in FIGS. 2 and 3, the piece of SMA wire 31 is hooked over the hook member 43, lying in the curved inner surface 45. The curvature of the inner surface 45 reduces the maximum curvature of the SMA wire 31 to protect against fatigue.

In the camera 1, the mounting members 32 and 33 are positioned on diametrically opposite points around the optical axis O. The hook member 43 of the resilient flexure element 41 is positioned mid-way between the two mounting members 32 around the optical axis O. As viewed along the optical axis, the halves of the SMA wire 31 extend at 90° to each other along sides of the camera 1. After the assembly and in equilibrium, the SMA wire 31 can be held in place with a small amount of adhesive, to ensure retention on the retaining elements 41 during operation or drop testing. This may be done after cycling of the SMA wire to help eliminate assembly tolerances.

The resilient flexure element 41 is arranged at a position along the optical axis O which is closer to the image sensor 4 than the portion of the mounting members 32 to which the piece of SMA wire 31 is crimped. As a result, each half of the piece of SMA wire 31 on either side of the resilient flexure element 41 is held at an acute angle to the optical axis O. Slippage over the resilient flexure element 41 during assembly assists in achieving equal lengths and tensions for the two halves of the piece of SMA wire 31.

The SMA wire 31 is held in tension in the camera 1 to apply a tensional force having a component along the optical axis O. In addition, each half of the SMA wire 31 applies a tensional force having a component perpendicular to the optical axis O. Some of the components of these forces are balanced by the symmetrical arrangement of the halves of the SMA wire 31 but there remains a net component of force radially of the optical axis O at the resilient flexure element 41, this tending to tilt the lens element 6. However, the tilt is resisted by the suspension system 9 to be sufficiently small to be adequate for many lenses and image sensors.

The operation of the camera 1 to drive movement of the lens element 6 along the optical axis O relative to the support structure 2 will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA wire 31 causes it to decrease in length. The material composition and pre-treatment of the SMA wire 31 is chosen so that the phase change occurs over a range of temperature which is above the expected ambient temperature during normal operation, typically above 70° C.

The SMA wire 31 is arranged in tension providing a net tensional force along the optical axis O between the lens element 6 and the support structure 2 in a direction moving the lens element 6 away from the image sensor 4. This force acts against the biassing force provided by the suspension system 9 in the opposite direction along the optical axis O. The flexures 13 flex depending on the tensional force from the SMA wire 31. The flexures 13 as manufactured are straight as viewed along their length radially of the optical axis O. On flexing the flexures 13 remain generally straight although some slight curvature may be generated. Thus the flexing of the flexures 13 provides biassing of the camera lens element 6 in an opposite direction from the tensional force applied by the SMA wire 31. In other words the suspension system 9 provides the function of acting as a passive biassing arrangement for the SMA wire 31 as well as the function of suspending and guiding movement of the camera lens element 6.

On heating of the SMA wire 31 so that the stress therein increases, the SMA wire 31 contracts against the biassing of the suspension system 9, moving the lens element 6 away from the image sensor 4. Conversely, on cooling of the SMA wire 31 so that the stress therein decreases, the biassing provided by the flexures 13 causes the SMA wire 31 to expand moving the lens element 6 towards the image sensor 4.

To maximise the movement of the lens element 6 relative to the support structure 2 along the optical axis O, the total stiffness of the flexures 13 of the suspension system 9 is preferably in the range from (a) the total stiffness of the SMA wire 31 experienced in the austenite phase of the SMA material to (b) the total stiffness of the SMA wire 31 experienced in the martensite phase of the SMA material, more preferably the geometric mean of values (a) and (b).

It is desired that the total stiffness against movement of the lens element 6 relative to the support structure 2 along the optical axis O, provided by the sum of the stiffnesses of the flexures 13 and the SMA wire 31, is sufficiently great to minimize the movement of the lens element 6 relative to the support structure 2 under gravity when the camera 1 changes between orientations. For typical lens systems the movement is desirably limited to at most 50 μm which for a typical miniature camera means that the overall stiffness should be at least 100N/m, preferably at least 120N/m.

The flexures 13 are designed with an appropriate width to provide the desired stiffness against movement of the lens element 6 relative to the support structure 2 in directions perpendicular to the optical axis O, based on the extent to which the lens element 7 can accommodate off-axis motion and tilting. The stiffness of the SMA wire 31 is also taken into account but usually provides a smaller contribution.

Another design consideration is to ensure that the maximum stress experienced by the flexures 13 and the SMA wire 31 do not over-stress the respective materials.

The degree of displacement of the lens element 6 relative to the support structure 2 along the optical axis O is dependent on the stress developed within the SMA wire 31 and also on the acute angle of the SMA wire 31 with respect to the optical axis O. The strain which may be developed in an SMA wire is limited by the physical phenomenon of the phase change. Due to the acute angles of the SMA wire 31 with respect to the optical axis O, the halves of the SMA wire 31 change in orientation when they change in length. This effectively gears the movement so that the degree of displacement of the lens element 6 along the optical axis O is higher than the change in length of the halves of SMA wire 31 resolved along the optical axis O. In general the acute angle may take any value but is approximately 70° in the example of FIGS. 2 and 3.

The position of the lens element 6 relative to the support structure 2 along the optical axis O may be controlled by control of the temperature of the SMA wire 31. In operation, heating of the SMA wire 31 is provided by passing a drive signal therethrough which provides resistive heating. Cooling is provided by ceasing the current and allowing the SMA wire 31 to cool by conduction to the surroundings. The cooling may be speeded up by reducing the thickness of the SMA wire 31, desirably to be at most 35 μm.

Figure 5:
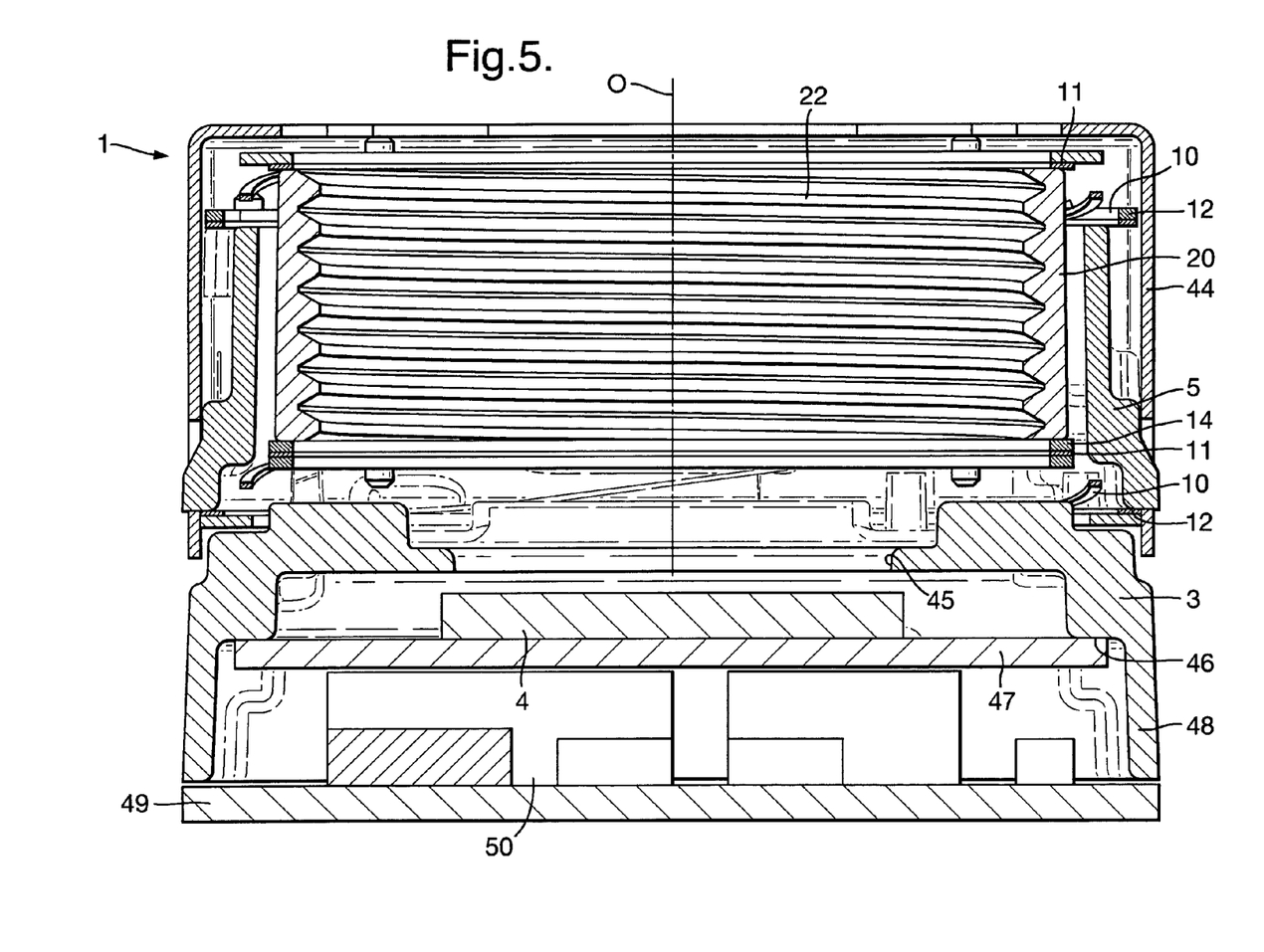
FIG. 5 is a detailed cross-sectional view of the camera.

FIG. 5 shows in detail the camera 1 except omitting the lens holder 21 for clarity. The additional components of the camera 1 beyond those shown in FIG. 2 will now be described.

The camera 1 has a screening can 44 clipped and bonded over the wall 5 of the support structure 2. The wall 5 is also bonded to the base 3 of the support structure 2. In the direction along the optical axis O, there are clearances between the lens element 6 and the screening can 44 and between the lens element 6 and the base 3 which allow sufficient movement of the lens element 6 along the optical axis O to provide for focussing of the image on the image sensor 4 whilst preventing a degree of movement which would damage the suspension system 9 or the SMA wire 31. Thus the screening can 44 and the base 3 effectively form end-stops for limiting the ends of the range of movement of the lens element 6 along the optical axis O.

The base 3 has a more complicated construction than is shown schematically in FIG. 1. In particular the base 3 has a central aperture 45 behind which the image sensor 4 is mounted. For mounting of the image sensor 4, the base 3 has a ledge 45 formed to the rear of the aperture 45 and outside the area of the aperture 45. On the ledge 46 is mounted an image circuit board 47 on which the image sensor 4 is formed facing and aligned with the aperture 45 to receive light along the optical axis O. Optionally the aperture 45 may have an infrared filter fitted thereacross to improve the image quality, but also as a seal to prevent dust landing on the image sensor 4.

The base 3 further includes a protruding wall 48 disposed outside the ledge 46 and protruding rearwardly. A drive circuit board 49 is mounted on the protruding wall 48 and a drive circuit 50 is formed thereon. Alternatives are to use an image circuit board 47 which is double-sided, with the drive circuit 50 mounted on its underside or to integrate the drive circuit 50 into the same chip as the image sensor 4.

A camera of similar construction to the camera 1 is described in co-owned International Patent Application No. PCT/GB07/001,050 containing additional disclosure about the construction and manufacture which may be applied to the camera 1. Accordingly, International Patent Application No. PCT/GB07/001,050 is incorporated herein by reference.

The drive circuit 50 is connected to the ends of the SMA wire 31 through the mounting members 32. The drive circuit 50 applies the drive signal to the SMA wire 31 to implement an auto-macro function in which the lens element 6 is driven to one of two positions, that is a far-focus position and a macro position. In the far-focus position, the lens element 6 is in its closest position to the image sensor 4 within its range of movement and the lens element 6 provides a far-field or hyperfocal focus on the image sensor 4. In the macro position, the lens element 6 is in its furthest position from the image sensor 4 within its range of movement and the lens element 6 provides a close-field focus on the image sensor 4.

To select the far-focus position, the drive circuit 50 supplies no current to the SMA wire 31 (or alternatively a very low current, although this undesirably increases power consumption). In this case, the SMA wire 31 applies less force than the biassing force provided by the suspension system 9. The SMA wire 31 may be slack. The suspension system 9 is arranged to bias the lens element 6 against the end-stop formed by the base 3 which therefore limits the movement and determines the position of the lens element 6 in the far-focus position. No power is consumed in the far-focus position which is the most common setting for the camera 1.

To select the macro position, the drive circuit 50 supplies a drive signal of sufficient power to contract the SMA wire 31 with more force than the biassing force provided by the suspension system 9, so as to drive the lens element 6 against the end-stop formed by the screening can 44 which therefore limits the movement and determines the position of the lens element 6 in the macro position. Power is consumed continuously in the far-focus position.

As the end-stops formed by the base 3 and the screening can 44 set the position of the movable element at each end of the range of movement, this ensures that the far-field and macro positions are repeatable and do not vary over repeated movement cycles, being largely independent of the detailed motion and force output of the actuator 30. The only tolerance is in the positioning of the end-stops themselves. The end-stops also set the tilt of the lens element 6 relative to the image sensor 4. This significantly reduces the constraints on the suspension system 9 which would otherwise need to control tilt which degrades the optical performance of the lens element 6.

Figure 6:
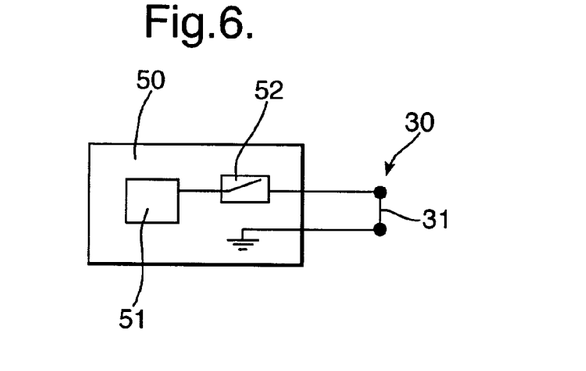
FIG. 6 is a diagram of the drive circuit.

Due to the auto-macro function, the drive circuit 50 can be constituted as shown in FIG. 6 simply by a source 51 connected to the SMA wire 31 through a switch 52, typically a semiconductor switch (e.g. a FET or a BFT). The switch 52 is opened to achieve the far-field position and closed to provide the macro position. The switch 52 may be controlled on the basis of user input. Alternatively, the switch 52 could be controlled on the basis of a measure of the quality of the focus derived by processing the output of the image sensor 4.

The amount of electrical power needed to cause the SMA wire 31 to contract a given amount will vary between different cameras 1 due to manufacturing tolerances, and also vary due to ambient temperature. In the macro position, the drive circuit 30 applies a drive current of sufficient power to drive the lens element 6 against the end-stop formed by the screening can 44 for any expected manufacturing tolerance over the operational temperature range. Within this constraint, the current source 52 may be of any type, for example a constant-current source or a constant-voltage source.

Thus the auto-macro function allows the drive circuit 50 to be simple and therefore cheap.

In the far-field position, the mechanical stresses in the SMA wire 31 are low (virtually no stress) as the SMA wire 31 is taking no load. In the macro position, the stresses in the SMA wire 31 are high, both in deflecting the suspension system 9 and in driving the lens element 6 with sufficient margin to take account of all possible variations in manufacturing tolerances and ambient temperature. As a result there is a potential problem that these stresses will result in damage to the SMA wire 31 over time. The SMA wire 31 is stiff and unable to accommodate large stresses without fatigue issues. With repeated operation in this region, there may be damage to the SMA wire 31 to the point where it might either fracture or perform out of specification before reaching the desired lifetime of the actuator 30, typically around 300,000 cycles or perhaps more.

However, this potential problem is reduced by the fact that the SMA wire 31 is connected to the lens element 6 by the resilient flexure element 41. The resilient flexure element 41 is compliant. Therefore, in the macro position when the lens element 6 is driven against the end-stop provided by the screening can 44, the resilient flexure element 41 is strained by being deflected by the SMA wire 31. This reduces the stress which would otherwise be generated in the SMA wire 31 which in turn reduces the risk of damage to the SMA wire 31. This increases the lifetime of the SMA wire 31.

In the camera 1, the resilient flexure element 41 forms a compliant connector between the SMA actuator 30 and the lens element 6. However, the same advantage can be achieved by providing a compliant connector between the SMA actuator 30 and the support structure 2. Similarly compliant connectors could be provided between the SMA actuator and each of the lens element 6 and the support structure 2.

Although the camera 1 operates using an auto-macro function, a similar advantage is achieved in any apparatus in which an SMA actuator drives a lens element or other movable element against an end-stop.

There are other possible solutions to the problem of overstressing the actuator 30 in the macro-position. These typically require the drive circuit 50 to be more complex.

For example, the drive circuit 50 may monitor the electrical resistance of the SMA wire 31 to detect when the macro position has been reached. The electrical resistance falls as the SMA wire 31 contracts, but will begin to rise at the end of the range of movement. Such a change in resistance can be detected and used to control and limit further heating of the SMA wire 31 and so limit the mechanical stresses. Alternatively, it is possible to design the camera 1 so that the contact between the lens element 6 and the end-stop formed by the screening can 44 corresponds to the electrical joining or breaking of two electrical contacts. These contacts can be used to provide either a direct cut-off of electrical heating (if they break on end-stop contact), or used as a simple sensing function to limit further heating of the SMA wire 31, or may even short-circuit the drive terminals of the SMA wire 31 so that most of the driving current is diverted away from the SMA wire 31 preventing further heating. It is also possible to arrange for the electric drive circuit 50 to make use of a separate measure of the ambient temperature to adjust the current applied to the SMA wire 31 to prevent overheating. This scheme would compensate for the ambient temperature effects, but not for the manufacturing tolerances associated with the positions of the end-stops relative to the lens element 6.

Although these options are possible, a preferred design solution is to minimise the complexity of the drive circuit 50 and so the provision of a compliant connector between the SMA actuator 30 and either or both of the support structure 2 and the lens element 6 is preferred.

There will now be described a modified form of the camera 1 in which the suspension system 9 is bistable. Apart from the modifications which will be described, the camera 1 remains as described above.

Figure 7:
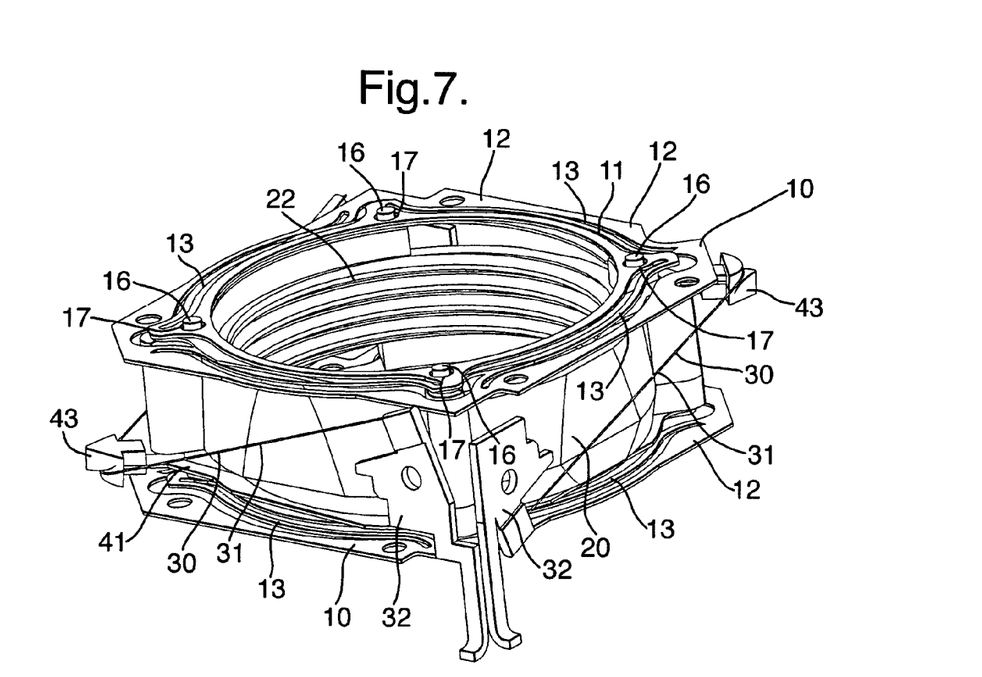
FIG. 7 is a detailed perspective view of a modified form of the camera with the support structure omitted.

The detailed construction of the modified form of the camera 1 is shown in FIG. 7 which is a detailed perspective view corresponding to that of FIG. 3 in that the support structure 2 is omitted for clarity.

Figure 8:
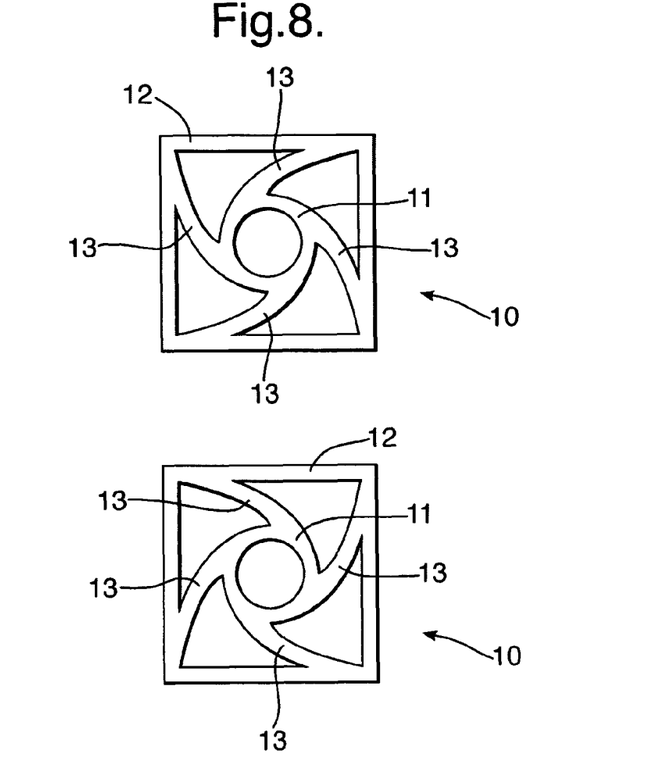
FIG. 8 is a schematic view of the two suspension elements of FIG. 7.

In this case, the suspension system 9 consists of two suspension elements 10 which are identical to the suspension elements 10 described above except that the flexures 13 of each suspension element 10 extend in opposite senses around the optical axis. This is shown schematically in FIG. 8 which shows the two suspensions elements 10 in plan view one above the other. Thus, the flexures 13 of the upper suspension element 10 as viewed in FIG. 7 extend from the outer ring 12 to the inner ring 11 in an anticlockwise sense, whereas the flexures 13 of the lower suspension element 10 as viewed in FIG. 7 extend from the outer ring 12 to the inner ring 11 in a clockwise sense. This may be achieved simply by flipping one of the two suspension elements 10.

This modification has the effect of making the suspension system 9 bistable in that it is capable of supporting the lens element 6 in two stable positions along the optical axis O, as follows.

It should first be noted that the suspension elements 10 tend to rotate the lens element 6 relative to the support structure 2 when the lens element 6 moves along the optical axis O. This is because movement of the lens element 6 along the optical axis O causes change in the angle of the flexures 13 as viewed radially of the optical axis. In the apparatus described above and shown in FIGS. 2 and 3, this causes a rotation of the lens element 6 around the optical axis O which is small but must nonetheless be accommodated in the optical design of the lens element 6.

In the modified form of the camera, the two suspension elements 10 tend to rotate the lens element 6 in opposite senses around the optical axis O. The suspension elements 10 are arranged so that the flexures 13 of each suspension element 10 mutually hold each other in compression. That is to say the flexures 13 are compressed along their length, that is around and perpendicular to the optical axis O. The suspension elements 10 are identical, except for the direction in which the flexures 13 extend, and as a result the compressional forces generated in each suspension element 10 balance one another.

As a result of being held in compression, the suspension elements 10 have a tendency to buckle. The effect of this arrangement is that there are two stable positions for the lens element 6 along the optical axis O, i.e. the system is bistable. The stable positions correspond to the inner ring 11 being displaced relative to the outer ring 12, on opposite sides of the outer ring 12 along the optical axis O. The camera 1 is arranged so that these two stable positions correspond to the ends of the movement of the lens element 6 along the optical axis O, i.e. to the far-focus position and the macro position. When the lens element 6 is positioned at one of these positions, in the absence of any applied force from an actuator, the lens element 6 will remain there. As described above, end-stops formed by the base 3 and screening can 44 are used to precisely locate the lens element 6 in these positions, as described above.

In order to drive movement of the lens element 6, the camera 1 comprises two SMA actuators 30 each of identical construction to the SMA actuator as described above, comprising a piece of SMA wire 31 connected between the support structure 2 and the lens element 6. However the two SMA actuators 30 are arranged to drive movement of the lens element 6 in opposite directions along the optical axis O. Thus a first SMA actuator 30 has an identical arrangement to the SMA actuator shown in FIGS. 2 and 3 and on contraction drives the lens element 6 away from the image sensor 4. The second SMA actuator 30 has a reverse orientation along the optical axis O and so on contraction drives the lens element 6 towards the image sensor 4. Thus the two SMA actuators 30 are coupled to opposite ends of the lens element 6. Each SMA actuator 30 is coupled to the lens element 6 by a resilient flexure element 41 which is a part of a metal support 14 and has the same construction as described above. As the metal support 14 is mounted on the lens element 6 on the same location posts 16 as the inner ring 11 of the suspension element 10 the camera 1 must be designed to accommodate movement of the lens element 6 without the metal support clashing with the outer ring 12 of the suspension element 10. This may achieved by including a spacer between the metal support and the inner ring 11, or by the outer ring 12 being provided with a gap or recess around the hook member 43.

The two SMA actuators 30 are each supplied with a drive signal from the drive circuit 50. However as the suspension system 9 is bistable, the drive circuit 50 only drives the SMA actuators 30 to change the position. When change in the focus position is desired, the drive circuit 50 supplies a drive signal of sufficient power to contract the SMA wire 31 of one of the SMA actuators with more force than the biassing force provided by the suspension system 9, so as to drive the lens element 6 to the other stable position. Thereafter, the drive circuit 50 supplies no current to either SMA actuator 30 (or alternatively a very low current, although this undesirably increases power consumption). As power is only consumed to move the lens element 6, not to hold the lens element 6 in either position, the power consumption of the modified form of the camera 1 is reduced.

Figure 9:
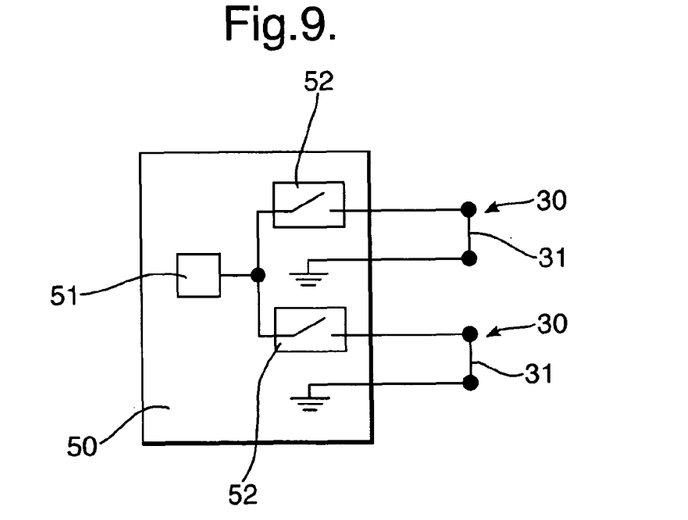
FIG. 9 is a diagram of the device circuit.

The drive circuit 50 can be constituted as shown in FIG. 9 simply by a source 51 connected to each SMA actuator 30 through a respective switch 52, typically a semiconductor switch (e.g. a FET or a BFT). The respective switches 52 are closed to move the lens element 6 and are subsequently opened.

During the movement of the lens element 6 along the optical axis O, the suspension system 9 guides the movement of the lens element 6 as described above. Thus in the modified form of the camera 1, the suspension system 9 combines in a simple and convenient manner the functions of guiding the movement of the lens element 6 with providing bistability. In particular, this design makes use of the fact that a single SMA actuator 30 is able to move the lens element 6 along the optical axis O to its respective mechanical end-stop, because the component of the forces generated in directions other than along the optical axis O are adequately resisted by the flexures 13.

In the modified form of the camera 1, the two suspension elements 10 are arranged so that the flexures 13 of each suspension element 10 mutually hold each other in compression as each suspension element 10 tends to rotate the lens element 6 in an opposite sense around the optical axis O. Other arrangements of suspension elements 10 and of the flexures 13 within the suspension elements 10 may be used to achieve this effect. Furthermore, the camera 1 may use flexures which are held in compression in some other way. For example, radially extending flexures held in compression may be used. Alternatively a mechanical bearing or contact may be used to hold the flexures in compression. For example, the suspension system 9 shown in FIGS. 2 and 3 could be provided with bistability by including a mechanical contact between the lens element 6 and the suspension system 2 which prevents relative rotation of the lens element about the optical axis O.

The form of the SMA actuator 30 described above has a number of advantages but is not essential. The two aspects of the present invention can equally be applied in an apparatus using a different form of SMA actuator. By way of example, some cameras employing an alternative form of SMA actuator will now be described.

Figure 10A:
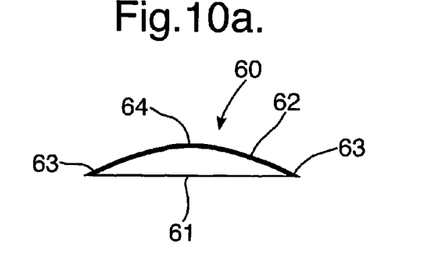
FIGS. 10a and 10b are side views of an SMA actuator.
Figure 10B:
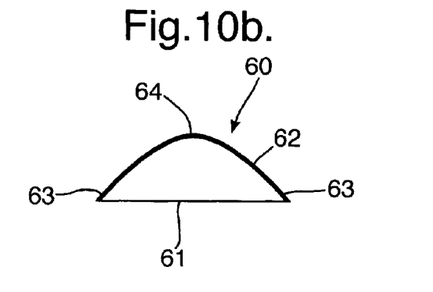

An SMA actuator 60 is shown in FIGS. 10a and 10b and comprises a piece of SMA wire 61 coupled at each end to a compliant member 62. The SMA wire 61 holds the member 62 in a flexed or buckled state so that the member 62 extends in a arc between its two ends. As the SMA wire 61 contracts, eg from the state shown in FIG. 10a to the state shown in FIG. 10b, the member 62 buckles further causing an increase in the distance between its ends 63 and the peak 64 of the buckled member 62, that is the height of the member 62 perpendicular to a notional line between its two ends (vertically in FIGS. 10a and 10b). The SMA actuator 60 can drive motion between the ends 63 and the peak 64 of the member 62. This arrangement suits the form factor of a miniature camera and produces high levels of displacement for a relatively short length of SMA wire 61.

Figure 11A:
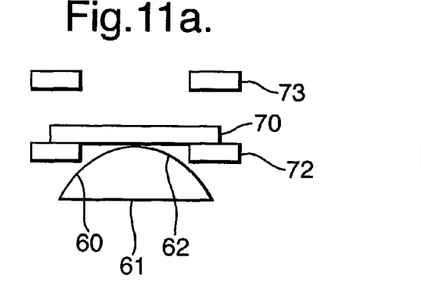
FIGS. 11a and 11d are side views of the SMA actuator of FIG. 9 driving a lens element.
Figure 11B:
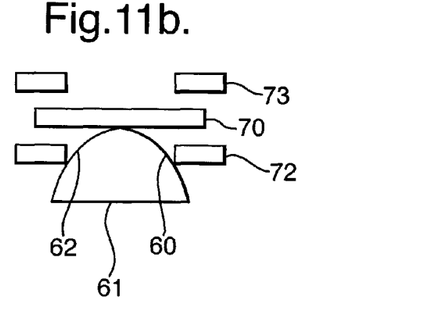
Figure 11C:
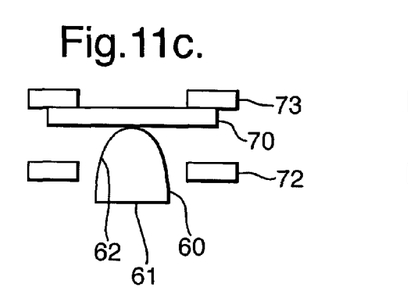
Figure 11D:
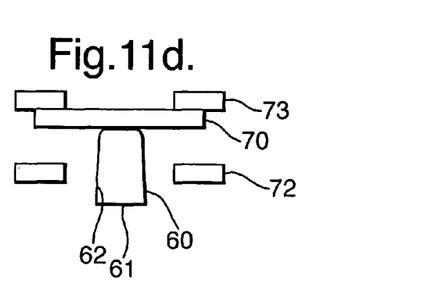

FIGS. 11a to 11d show a sequence of the SMA actuator 60 being used to move a lens element 70 from a first end-stop 72 to a second end-stop 73 as the SMA wire 62 contracts. The ends 63 of the member 62 engage a support structure (not shown) fixed relative to the end-stops 72 and 73. The peak 64 engages the lens element 70. As shown in FIGS. 11a to 11c, as the SMA wire 61 contracts, the SMA actuator 60 moves the lens element 70 along the optical axis O from the first end-stop 72 to the second end-stop 73. As the member 62 is compliant it effectively forms a compliant connector between the lens element 70 and the SMA wire 61. Thus when the lens element 70 is driven against the second end-stop 73, the member 62 is strained by being deformed against the lens element 70 as the SMA wire 61 contracts further. This reduces the stress which would otherwise be generated in the SMA wire 61 which in turn reduces the risk of damage to the SMA wire 61 and increases the lifetime of the SMA wire 61.

Figure 12:
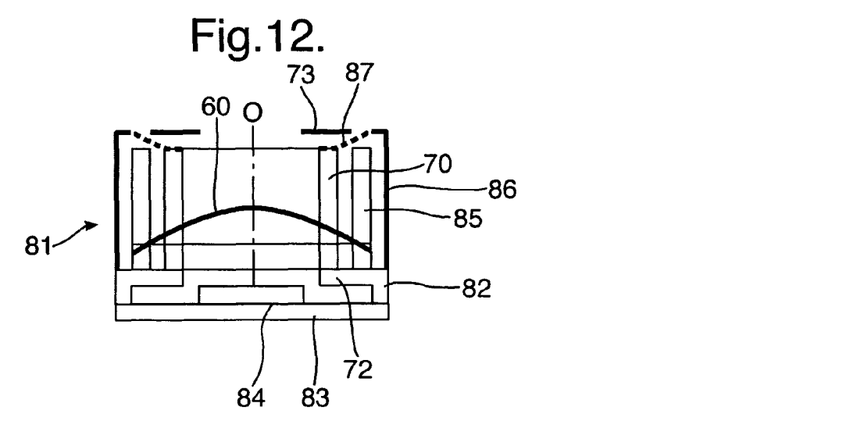
FIG. 12 is a schematic side view of a camera.

FIG. 12 shows a camera 81 in which the SMA actuator 60 is arranged. The camera 80 comprises a support structure 82 comprising a base 83 on which there is mounted an image sensor 84. The support structure 82 further comprises an annular wall 85 protruding from the front side of the base 83. The camera 81 further comprises a lens element 70 which focuses light onto the image sensor 84. The lens element 70 is suspended in the annular wall 85 by a simple bearing arrangement between the outside of the lens element 70 and the inside of the annular wall 85. Assuming the camera 81 has a height of around 3.5 mm, in order to maintain an angular misalignment tolerance of ±0.3°, a radial clearance of 18 mm between the lens element 70 and the annular wall 85 is required. Further reductions of this clearance with precision injection moulding techniques would improve the optical performance.

The SMA actuator is arranged to drive movement of the lens element 70 relative to the support structure 82 in the manner shown in FIGS. 11a to 11d. The camera 81 has a first end-stop 72 formed on the support structure 82 and a second end-stop 73 formed by a screening can 86 attached to the support structure 82.

A return spring 87 is provided between the lens element 70 and the screening can 86 to act as a biassing arrangement to bias the lens element 70 in an opposite direction from the SMA actuator 60. The return spring 87 is typically a sheet metal part and leaf spring features could easily be formed.

The suspension system for the lens element 60 may be modified to make it bistable in that it is capable of supporting the lens element 70 in two stable positions along the optical axis O. In order to provide this functionality, a bi-stable element is introduced to the system. In general there are many examples of bi-stable mechanism and any such mechanism could be used. The majority of simple solutions are either spring loaded or magnetically biassed. Design influence may be taken from products such as biro pen protrusion/retraction mechanisms (known as "push to make, push to break") and electrical switches.

Figure 13:
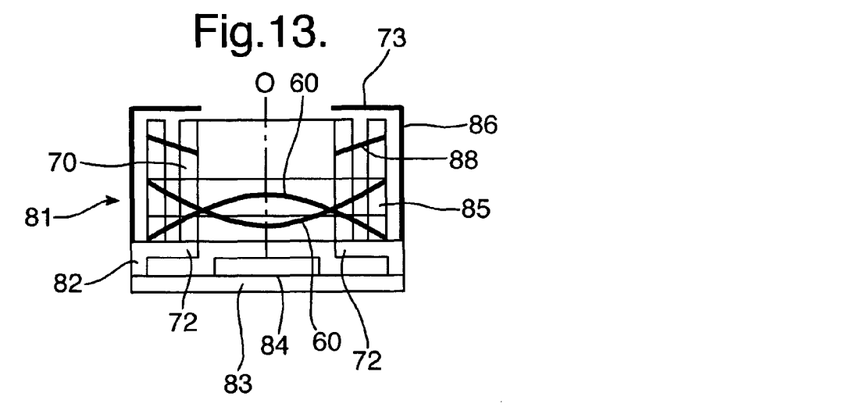
FIG. 13 is a schematic side view of a modified form of the camera.
Figure 14A:
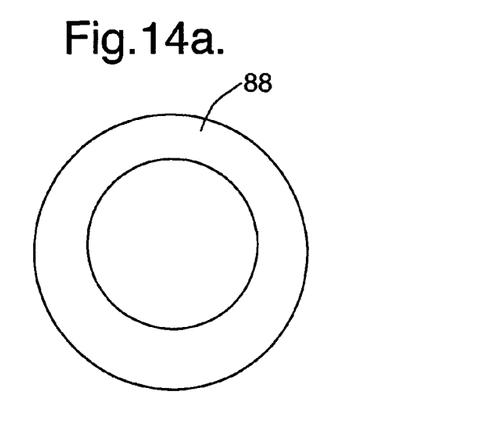
FIGS. 14a and 14b are a plan view and a cross-sectional view of a coned-disk spring.
Figure 14B:
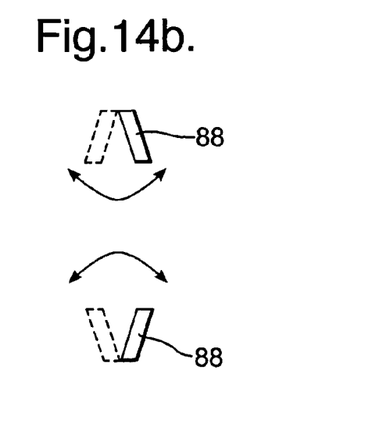

FIG. 13 shows a modified form of the camera 81 incorporating a bistable mechanisms in the form of a coned-disk spring 88 which is a particularly simple arrangement suited to the form factor of a miniature camera. The coned-disk spring 88 is shown in detail in FIGS. 14a and 14b which are a plan view and a cross-sectional view respectively. The coned-disk spring 88 can snap between the two forms shown in continuous and dotted outline in FIG. 14b when displaced a certain distance in a given direction.

The coned-disk spring 88 is connected between the lens element 70 and the support structure 82 so that the lens element 70 can be supported in two stable positions along the optical axis O. The camera 1 also has two SMA actuators 60 each arranged to drive the lens element 70 in opposite directions between the two stable positions. Alternatively some other form of SMA actuator could be used, for example of the type used in the camera 1 of FIG. 7. In this modified form of the camera a biassing arrangement is no longer required and thus the return spring 87 has been omitted.

In order to simplify the design and assembly of the camera 81, the functionality of the members 62 of the SMA actuators 60 and the coned-disk spring 88 could be combined into a single formed sheet metal part. Two SMA wires would be attached to this formed part and actuated asynchronously. It should be noted that the SMA wire would not be subject to accelerated life damage as the SMA actuator would over-latch the coned-disk spring 88 that would continue to cause the lens element 60 to travel to each end-stop 72 and 73. The SMA actuator stroke would be less than that of the lens element 60 between the end-stop 72 and 73.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:

1. A shape memory alloy actuation apparatus comprising:
a support structure;
a movable element;
a suspension system supporting the movable element on the support structure and guiding movement of the movable element relative to the support structure in a movement direction, the suspension system comprising plural resilient flexures connected between the movable element and the support structure in compression and arranged with the compressional forces generated in the resilient flexures balancing in a direction perpendicular to the movement direction, the plural resilient flexures being capable of supporting the movable element in two stable positions along the movement direction; and
two shape memory alloy actuators each arranged on contraction thereof to drive movement of the movable element in respective, opposite directions between the two stable positions.

2. A shape memory alloy actuation apparatus according to claim 1, wherein the ends of the plural resilient flexures connected to the movable element are constrained to move relative to the support structure along the movement axis direction.

3. A shape memory alloy actuation apparatus according to claim 1, wherein the resilient flexures extend from the support structure to the movable element around the movable element.

4. A shape memory alloy actuation apparatus according to claim 3, wherein the plural resilient flexures comprises two sets of resilient flexures, each set of resilient flexures arranged with rotational symmetry around the movable element with the compressional forces generated in the resilient flexures of the set tending to rotate the movable element in respective, opposite senses.

5. A shape memory alloy actuation apparatus according to claim 4, wherein two sets of resilient flexures are at different positions along the movement direction.

6. A shape memory alloy actuation apparatus according to claim 5, wherein the resilient flexures of each set are formed from a common sheet of material.

7. A shape memory alloy actuation apparatus according to claim 1, wherein each one of the shape memory alloy actuators is connected to the movable element by a respective compliant connector.

8. A shape memory alloy actuation apparatus according to claim 7, wherein each one of the shape memory alloy actuators comprises shape memory alloy wire which is connected to the support structure and to the movable element and is in tension on contraction.

9. A shape memory alloy actuation apparatus according to claim 8, wherein the shape memory alloy wire of each shape memory alloy actuator extends at an acute angle to the movement direction of the movable element.

10. A shape memory alloy actuation apparatus according to claim 8, wherein said compliant connectors each comprise a flexure protruding from said the movable element.

11. A shape memory alloy actuation apparatus according to claim 10, wherein the flexure of each compliant connector comprises a metal sheet.

12. A shape memory alloy actuation apparatus according to claim 10, wherein a portion of the shape memory alloy wire of each shape memory alloy actuator intermediate its ends is hooked over said flexure.

13. A shape memory alloy actuation apparatus according to claim 12, wherein the ends of the shape memory alloy wire of each shape memory alloy actuator are rigidly connected to the support structure.

14. A shape memory alloy actuation apparatus according to claim 13, wherein the ends of the shape memory alloy wire of each shape memory alloy actuator are connected to a crimp member which crimps the ends of the shape memory alloy wire, the crimp member being rigidly fixed to the support structure.

15. A shape memory alloy actuation apparatus according to claim 1, further comprising a drive circuit connected to the shape memory alloy actuators to supply a drive signal thereto.

16. A shape memory alloy actuation apparatus according to claim 1, wherein the movable element is a camera lens element, the suspension system guiding movement of the camera lens element relative to the support structure along the optical axis of the camera lens element.

17. A shape memory alloy actuation apparatus according to claim 16, wherein the camera lens element includes one or more lenses having a diameter of at most 10 mm.

18. A camera unit comprising:
an image sensor; and
a shape memory alloy actuation apparatus according to claim 16, the camera lens element being arranged to focus an image on the image sensor.

* * * * *